Figure 1:
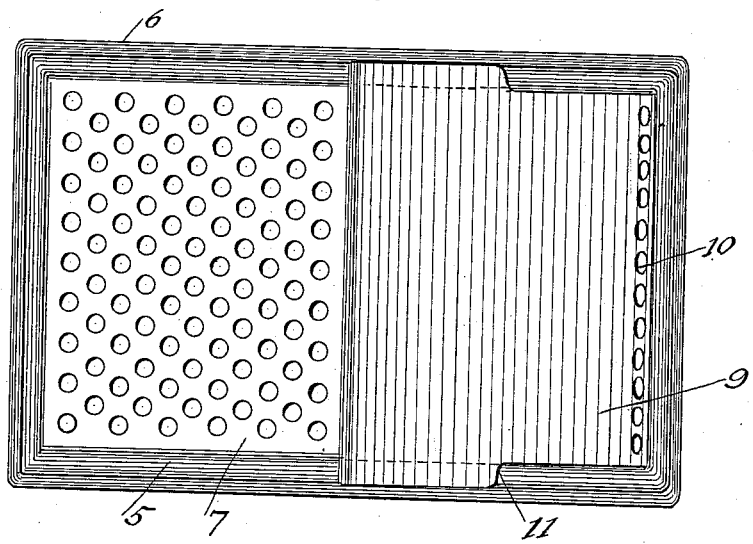

A. A. OTTO.
DRIP PAN.
APPLICATION FILED MAY 19, 1911.

1,017,455.

Patented Feb. 13, 1912.

WITNESSES:
Erich Burkly
K. H. Butler

INVENTOR.
BY Albert A. Otto.
H. C. Evert & Co
ATTORNEYS.

UNITED STATES PATENT OFFICE.

ALBERT A. OTTO, OF PITTSBURGH, PENNSYLVANIA, ASSIGNOR OF ONE-HALF TO EDWARD C. MILLER, OF PITTSBURGH, PENNSYLVANIA.

DRIP-PAN.

1,017,455.  Specification of Letters Patent.  Patented Feb. 13, 1912.

Application filed May 19, 1911. Serial No. 628,221.

*To all whom it may concern:*

Be it known that I, ALBERT A. OTTO, a citizen of the United States of America, residing at Pittsburgh, in the county of Allegheny and State of Pennsylvania, have invented certain new and useful Improvements in Drip-Pans, of which the following is a specification, reference being had therein to the accompanying drawing.

This invention relates to drip pans, and the objects of my invention are, first, to provide a pan or receptacle that can be advantageously used for supporting washed dishes whereby the water can readily drain from the same prior to being wiped; second, to provide a drip pan that can be easily placed upon the top of another pan or receptacle for safely supporting dishes in an elevated position relatively to said receptacle, and third, to provide a drip pan that is simple in construction, durable and inexpensive to manufacture.

I attain the above objects by a mechanical construction that will be hereinafter specifically described and then claimed, and reference will now be had to the drawing, wherein:—

Figure 2:
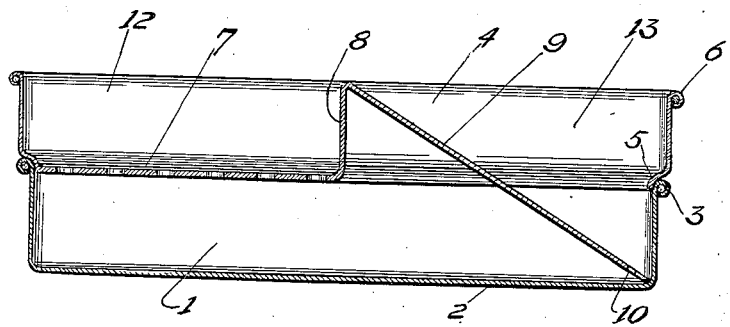
Figure 3:
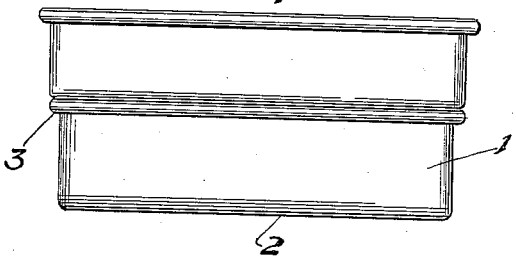

Figure 1 is a plan of the drip pan. Fig. 2 is a longitudinal sectional view of the same, and Fig. 3 is an end view of the pan.

The reference numeral 1 denotes a rectangular receptacle having a flat bottom 2 and the upper edges thereof provided with a wire reinforced rim 3.

The reference numeral 4 denotes a rectangular shell having the lower edges thereof reamed inwardly, as at 5 whereby the shell can be set upon the upper edges of the receptacle 1. The upper edges of the shell 4 are reinforced by a wire 6, and formed integral with the lower edges of the shell, at one end thereof, is a perforated bottom plate 7. Formed integral with the bottom plate 7 is a central vertical wall 8 corresponding in depth to the shell 4, and the upper edge of the wall 8 is integral with an inclined platform 9 extending to one end of the bottom of the receptacle 1. The lower end of the platform 9 is provided with a row or series of perforations 10, and the lower part of said platform is reduced or has the side edges thereof cut away, as at 11 to provide clearance for the lower reamed edge 5 of the shell 4.

The vertical wall 8 and the perforated bottom plate 7 coöperate with the walls of the shell 4 in providing a compartment 12 at one end of the drip pan, and the platform 9 coöperates with the walls of the shell 4 and the receptacle 1 in providing a compartment 13 at the opposite end of the drip pan.

Cups, glasses, and other articles can be placed in the compartment 12 and plates and flat dishes can be placed one upon the other in the compartment 13. In both instances water draining from the washed dishes enters the receptacle 1, and when it is desired to empty the receptacle 1, the shell 4 can be removed from the upper edge of the receptacle even with some of the dishes in the compartment 12.

The drip pan in its entirety can be made of light and durable galvanized or non-corrosive material and of various sizes and proportions.

What I claim is:—

1. A drip pan comprising an open top receptacle, a shell having a contracted lower portion extending into and seated upon the top of said receptacle, a perforated plate formed integral with the bottom of said shell and of a width approximately half the length of the shell, a vertically disposed wall integral with and forming in connection with said plate and shell a compartment, and a downwardly inclined member extending from the top of said wall, through said shell and into said receptacle to one end of the latter and forming in connection with the receptacle and shell a compartment.

2. A drip pan comprising an open top receptacle, a shell having a contracted lower portion extending into and seated upon the top of said receptacle, a perforated plate formed integral with the bottom of said shell and of a width approximately half the length of the shell, a vertically disposed imperforate wall integral with and forming in connection with said plate and shell a compartment, and a downwardly inclined member extending from the top of said wall, through said shell and into said receptacle to one end of the latter and forming in connection with the receptacle and shell a compartment, said member engaging the side walls of the shell and having a transverse row of perforations in proximity to its lower end.

In testimony whereof I affix my signature in the presence of two witnesses.

ALBERT A. OTTO.

Witnesses:
EDWARD C. MILLER,
MAX H. SROLOVITZ.

Copies of this patent may be obtained for five cents each, by addressing the "Commissioner of Patents, Washington, D. C."